United States Patent [19]

Fickelscher

[11] Patent Number: 4,545,263
[45] Date of Patent: Oct. 8, 1985

[54] GEARBOX

[75] Inventor: Kurt G. Fickelscher, Frankenthal, Fed. Rep. of Germany

[73] Assignee: Balcke-Dürr AG, Ratingen, Fed. Rep. of Germany

[21] Appl. No.: 480,495

[22] Filed: Mar. 30, 1983

[30] Foreign Application Priority Data

Mar. 30, 1982 [DE] Fed. Rep. of Germany ....... 3211616

[51] Int. Cl.⁴ .................. F16H 33/00; F16H 1/28; F16H 3/44; F16D 11/06
[52] U.S. Cl. ..................................... 74/640; 74/804; 74/805; 74/794; 192/18 A
[58] Field of Search ............. 74/640, 804, 805, 793, 74/794; 192/18 A, 18 B, 18 R

[56] References Cited

U.S. PATENT DOCUMENTS

| 3,164,036 | 1/1965 | Lamburn et al. | 192/18 A X |
| 3,872,954 | 3/1975 | Nordstrom et al. | 192/18 A |
| 3,918,326 | 11/1975 | Kida et al. | 74/640 |
| 4,099,427 | 7/1978 | Fickelscher | 74/640 X |
| 4,235,129 | 11/1980 | Takasu | 74/805 |
| 4,425,822 | 1/1984 | Marschner et al. | 74/640 |
| 4,434,682 | 3/1984 | Fickelscher | 74/640 X |

FOREIGN PATENT DOCUMENTS

| 1948236 | 8/1966 | Fed. Rep. of Germany. | |
| 2617951 | 10/1977 | Fed. Rep. of Germany. | |
| 2742442 | 3/1980 | Fed. Rep. of Germany. | |
| 2944123 | 10/1981 | Fed. Rep. of Germany. | |
| 214258 | 5/1968 | U.S.S.R. | 74/640 |
| 329340 | 3/1972 | U.S.S.R. | 74/804 |
| 882735 | 11/1981 | U.S.S.R. | 74/640 |

Primary Examiner—Leslie A. Braun
Assistant Examiner—Stephen Andrews
Attorney, Agent, or Firm—Schwartz, Jeffery, Schwaab, Mack, Blumenthal & Evans

[57] ABSTRACT

Gearbox comprising a first clutch-hub having gear-teeth and a coaxial hollow wheel also with gear-teeth, connected to, but not rotating upon, a second clutch hub, and also having a planetary gear in part engagement with the gear-teeth and an adjustable transmission-shaft. The latter is adapted to be adjusted, by means of an adjusting device, in such a manner that the clutch-hub and the hollow wheel rotate selectively, either at rotational speeds between which there is a predetermined difference, or in synchronism. In a known gearbox of this kind, the planetary gear is arranged eccentrically upon the transmission-shaft, causing relatively considerable imbalance and relatively high bearing loads at high rotational speeds. In order to overcome this problem, and to achieve a simple design, especially of the transmission shaft, the invention proposes that the first clutch-hub comprise a radially spaced, internally toothed ring, creating an annular space. Arranged at least partly in this annular space is the transmission-shaft and the internally-hollow, coaxially arranged planetary gear.

15 Claims, 4 Drawing Figures

GEARBOX

BACKGROUND OF THE INVENTION

1. Field of the Invention

The invention relates to a gearbox having a first clutch-hub comprising gear-teeth and a coaxial hollow wheel, also with gear-teeth, connected to, but non-rotatable upon, a second clutch-hub, a planetary gear of which the ring-gear is in partial engagement with the said gear-teeth, and a transmission-shaft mounted upon the clutch-hub and arranged between the latter and the said hollow wheel, the said transmission-shaft being adjustable, by means of an adjusting device, in such a manner that the clutch-hub and the hollow wheel rotate selectively, either at rotational speeds between which there is a predetermined difference, or in synchronism, the radially inner clutch-hub being adapted to be secured to the said transmission-shaft for the purpose of synchronous rotation.

2. Description of the Prior Art

German Utility Model No. 1 948 236 describes a gearbox of the type mentioned above in which the clutch-hubs, the drive-shaft and driven shaft are arranged coaxially with each other. Located between the said shafts is a transmission-shaft with an intermediate member having a cutout which partially exposed a pinion connected to the radially inwardly located drive-shaft. The transmission-shaft also comprises a cylindrical, eccentrically arranged section for the toothed ring of a planetary gear. The production of such transmission-shaft is relatively costly. Furthermore, the eccentric section of the transmission-shaft, together with the planetary gear, produce a not negligeable amount of imbalance, leading to comparatively large bearing forces and, possibly, to critical vibration. Moreover, such a gearbox has relatively little elasticity and impacts are therefore transferred practically undamped from one clutch-hub to the other. Because of the imbalance, the known gearbox is not practical for higher rotational speeds.

German Pat. No. 27 42 442 describes a resilient clutch having two central wheels of the same type, with rows of teeth arranged side by side and a planetary gear. The teeth of the planetary gear project into the substantially wedge-shaped virtual tooth-gaps between the central wheels, the profiles of the planetary-gear teeth being in direct engagement with those of the central wheels and being pressed into the gaps between the teeth by radial spring-action. An elastic shaft-coupling of this kind can produce only a direct, synchronous torque-transfer which, in many applications, is a major disadvantage. In this connection, mention may be made of boiler-feed pumps in power-stations which, for safety reasons, must be designed for an approximate 5% overload. By means of chokes in the feed-water valve, or by increasing the slip in a hydraulic transmission-coupling, it has so far been customary to return to the nominal point which involves a considerable loss of power. Since, in the case of turbines, power varies as the cube of the r.p.m., a 5% change in r.p.m. in a centrifugal pump varies the output from the driving machine by 15.7%. The investment required to increase the output of the driving machine is not negligeable. Increased power costs for the driving machine must also be taken into account. It has not been possible to solve these problems with existing shaft-coupling and/or gearboxes.

German Pat. No. 26 17 951 describes a planetary transmission based upon a working mechanism comparable with the above-mentioned elastic coupling. In the case of the planetary transmission, however, the central wheels have different numbers of teeth and the teeth of the resilient planetary gear are forced, by a drive-element, more or less deeply into the gaps between the teeth. A torque-transfer at synchronized rotational speed cannot be obtained with a planetary transmission of this kind.

Finally, German Pat. No. 29 44 123 describes a voltage-surge shaft transmission comprising a drive-motor and a sealed housing. Secured to the housing is a deformable voltage-wheel with which is associated a ring-wheel. A second ring-wheel is secured to an adjusting element. In order to counteract undue deformation, at least one additional support-means, acting in the radial direction, is provided on the driving side of the voltage wheel. The known voltage shaft transmission is to comprise hermetic sealing and to meet extreme safety requirements. Torque-transfer at synchronized rotational speed is not possible, so that the above-mentioned poor efficiency applies here also.

SUMMARY OF THE INVENTION

It is an object of the present invention to provide a gearbox of the type mentioned above with which it is possible to obtain a simple and functional unit and to avoid imbalance. This gearbox is also suitable for high rotational speeds and, more particularly for use in the construction of large machines which are inexpensive to produce and assemble. The gearbox of the present also has sufficient elasticity and damping characteristics adaptable to the relevant operating conditions.

This object is achieved in that the first clutch-hub comprises a radially spaced, internally toothed ring which forms an annular space into which the transmission shaft and the inner, hollow, coaxial planetary gear project at least partly. The gearbox according to the present invention is noted for its simple and inexpensive construction. On the one hand, the annular space and coaxial arrangement results in a compact unit and, on the other hand, imbalance is avoided. The gearbox according to the present invention is a compact and integrated arrangement of components arranged in a radially outward direction and substantially coaxially with each other, thus simplifying production and reducing assembly costs. In the axial direction, the gearbox is comparably short, so that it represents a satisfactory combination of assembly conditions, structural volume and material cost.

According to one desirable embodiment, the first clutch-hub is integral with the radially spaced ring. This provides particularly compact and inexpensive design, especially since no coupling elements are needed between the clutch-hub and the ring.

According to another preferred embodiment at least two transmission-steps are provided in the annular space, the said steps being connected together by an internally-toothed sleeve and being thus arranged in series. This permits a large difference in the rotational speeds between the two clutch-hubs in a relatively small space. Within the scope of the invention, each transmission-step may be actuated independently with its own drive-shaft and adjusting device.

It will be seen that this relatively inexpensive arrangement makes it possible to preselect the differences in rotational speeds in fixed discrete steps. In addition to this, the ratio may be either stepped up or stepped down, depending upon the number of teeth.

BRIEF DESCRIPTION OF THE DRAWINGS

Further advantages, and characteristics essential to the present invention will be gathered from the following description of embodiments given in conjunction with the appended drawings wherein.

DESCRIPTION OF THE PREFERRED EMBODIMENTS

Figure 1:
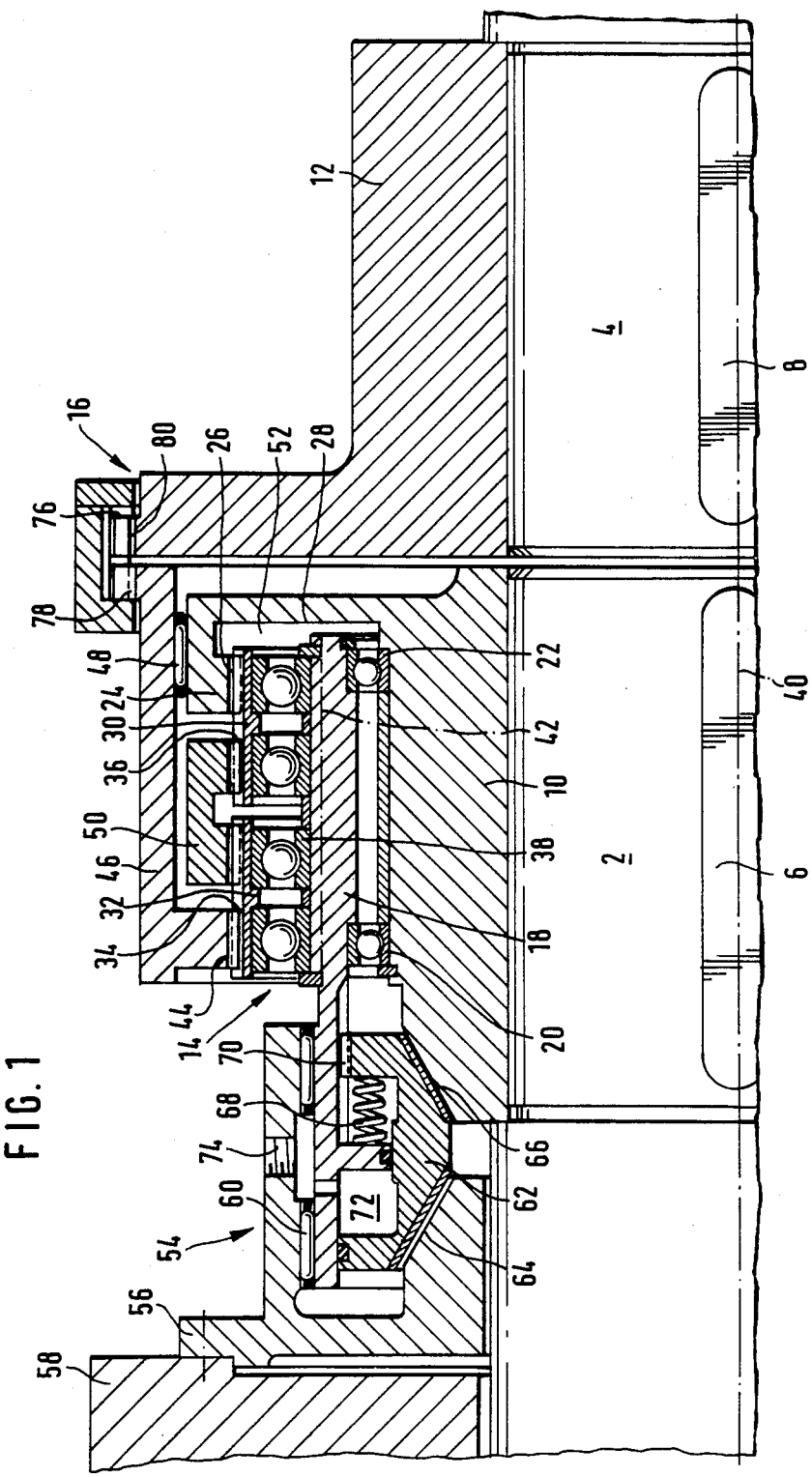
FIG. 1 is an axial longitudinal cross-section through an embodiment having two transmission-steps arranged externally upon a hollow shaft, the latter being adapted to be actuated by a brake.

The axial longitudinal cross-section of FIG. 1 shows two machines shafts 2,4 to be connected together, being secured by keys 6,8 respectively to a first clutch-hub 10 and to a second clutch-hub 12. It should be noted that shaft 2 may be connected to a working machine, for example, and shaft 4 to a driving machine, or vice-versa. Located between the first clutch-hub 10 and the second clutch-hub 12 are a transmission 14 and a resilient coupling 16. Transmission 14 contains a transmission-shaft 18 which is in the form of a hollow member at least partly surrounding clutch-hub 10.

Mounted between first clutch-hub 10 and transmission-shaft 18 is a bearing arrangement comprising two ball-bearings 20,22. Transmission-shaft 18 is thus securely supported on the clutch-hub 10, the ball-bearings 20,22 being of comparatively small diameter. The first clutch-hub 10 has a radially outward ring 24 forming an internal gear 26. Ring 24 is joined to clutch-hub 10 through disc-shaped flange 28, parts 10, 28, 24 being made in one piece. Transmission 14 contains two steps, both in the form of sliding-wedge transmissions. A sliding-wedge transmission which, in principle, may also be called a planetary transmission, is described in detail in German Pat. 26 17 951. The two transmission-steps are of basically similar design, each comprising a planetary gear 30,32 with teeth in the form of bands 34,36. Planetary gears 30,32 are mounted on transmission-shaft 18 by means of four separate ball-bearings 38. The outer surface of transmission-shaft 18 is not concentric with longitudinally axis 40, but has a generally oval contour (see in FIG. 3). Dotted line 42 indicated the outer surface of transmission shaft 18 at location about 90° from that of FIG. 1 and in relation to the longitudinal axis 40. At this location, which may lie in front of or behind the plane of the drawing, toothed band 36 is out of meshing engagement with internal gear 26 and toothed band 34 is also out of meshing engagement with an internal gear 44 of a hollow wheel 46.

Within the angular range shown, and within a diametrically opposite angular range, toothed bands 34,36 mesh as shown, with the internal gears 44,26. A sliding-wedge transmission of this kind constitutes a kinematically self-locking transmission. Hollow wheel 46 is mounted, in a specific manner, by a roller-bearing 48, externally upon ring 24. The two transmission-steps are connected in series by means of an internally toothed sleeve 50. Thus transmission-shaft 18, which is in the form of a hollow shaft, projects partly inside an annular space 52 formed by the ring 24 and also by the hollow wheel 46. The four ball-bearings 38 of transmission 14 are arranged directly upon the outer surface of transmission-shaft 18 and are therefore of comparatively small diameter. As a result of this, peripheral velocities in these ball-bearings are also comparatively low. It need not be emphasized that the outer races of ball-bearings 38, as well as planetary gears 30, 32, are preferably elastically deformable, so that toothed bands 34, 36 can be pushed in the necessaary manner into the virtual gaps between the teeth and can slide out of these gaps again. Particularly significant is the fact that the remaining transmission parts are arranged externally of transmission-shaft 18, so that when the said transmission-shaft is held stationary, the remaining parts of the transmission can continue to rotate at a corresponding peripheral velocity, thus ensuring simple and reliable cooling.

Associated with transmission-shaft 18 is an adjusting device 54 which, in this case, is in the form of a brake comprising a brake-housing 56 secured to a stationary component 58. Transmission-shaft 18 is supported in brake-housing 56 by means of a radial bearing 60. The said brake also contains a brake-shoe 62 having two conical braking surfaces 64, 66 associated with correspondingly conical surfaces of housing 56 and first clutch-hub 10. A spring 68 biasses braking surface 66 of the brake-shoe against first clutch-hub 10, as shown. In relation to transmission-shaft 18, brake-shoe 62 is axially displaceable in the direction of longitudinal axis 40, but is prevented from rotating by means of teeth or a key 70. In the position shown, brake-shoe 62 is connected frictionally to first clutch-hub 10, the above-mentioned key or teeth 70 allowing transmission-shaft 18 to rotate in synchronism with first clutch-hub 10. The parts of the transmission do not move in relation to each other, so that transmission 14 acts as a resilient coupling and is kinematically self-locking. As a result of this, clutch-hubs 10, 12 do not run at differential rotational speeds, since direct coupling is effected by coupling 16. Machine-shafts 2 and 4 thus rotate in synchronism.

Axially displaceable brake-shoe 62 comprises an annular chamber 72 to which a pressure-medium or hydraulic oil may be fed through a passage 74. If pressure is applied to annular chamber 72, brake ekement 62 will move, after overcoming the force of spring 68, to the left in the drawing, allowing conical braking surface 64 to engage with the matching surface of brake housing 56. This brakes transmission-shaft 18 down to zero. This allows planetary gears 30, 32 to run, on ball-bearings 38, upon the oval outer surface of transmission-shaft 18 which is now stationary. Depending upon the number of teeth on internal gears 26, 44 and sleeve 50, there will now be a difference in rotational speed between clutch-hub 10 and hollow-wheel 46. In this connection, the relative motion or difference in rotational speed between transmission-shaft 18 and first clutch-hub 10 is critical. Brake 54 shown here brings transmission shaft 18 to a complete stop. It is expressly emphasized that, within the scope of this invention, there is also partial, more particularly controlled, braking and a specific difference in rotational speed between the transmission-shaft 18 and the first clutch-hub 10. Thus the mechanical brake shown here may also be replaced by an electrical induction-brake or, generally speaking, brakes providing adjustable slip may be provided.

In FIG. 1, the two transmission-steps, with planetary gears 30, 32, are arranged upon a common shaft. In an alternative embodiment, not shown here, the two transmission-steps are arranged upon separate shafts, and each shaft is actuated by separate adjusting device. In this case, the numbers of teeth in the transmission steps are predetermined in such a manner that, as seen from machine-shaft 2 to machine-shaft 4, one transmission-step acts as a step-down transmission while the other acts as a step-up transmission. A design of this kind is of particular advantage for certain applications. Furthermore transmission steps arranged upon separate shafts may have different transmission-ratios, so that, with the transmission-shafts stopped separately, transmission-conditions may be varied stepwise.

Resilient coupling 16 comprises a toothed band 76 which engages in the gaps between the teeth in a ring 78 of hollow wheel 46 and in a ring 80 of second clutchhub 12. These are externally toothed rings 78, 80 which are at a short distance from each other in the direction of longitudinal axis 40. When coupling 16 is under load, the profiles of the teeth in the band and the rings slide radially upon each other, which produces a satisfactory damping effect upon torsional vibration. Errors in alignment and axis-displacement, almost unavoidable in practice, may be largely kept away from transmission 14 by resilient coupling 16. This provides one of the main objects of the invention, namely that almost no additional movements are introduced into transmission 14, thus ensuring comparatively quiet operation and long service-life. Moreover, as already indicated, coupling 16 absorbs torsional vibration, this relieving transmission 14 of a not negligeable part of its load.

Figure 2:
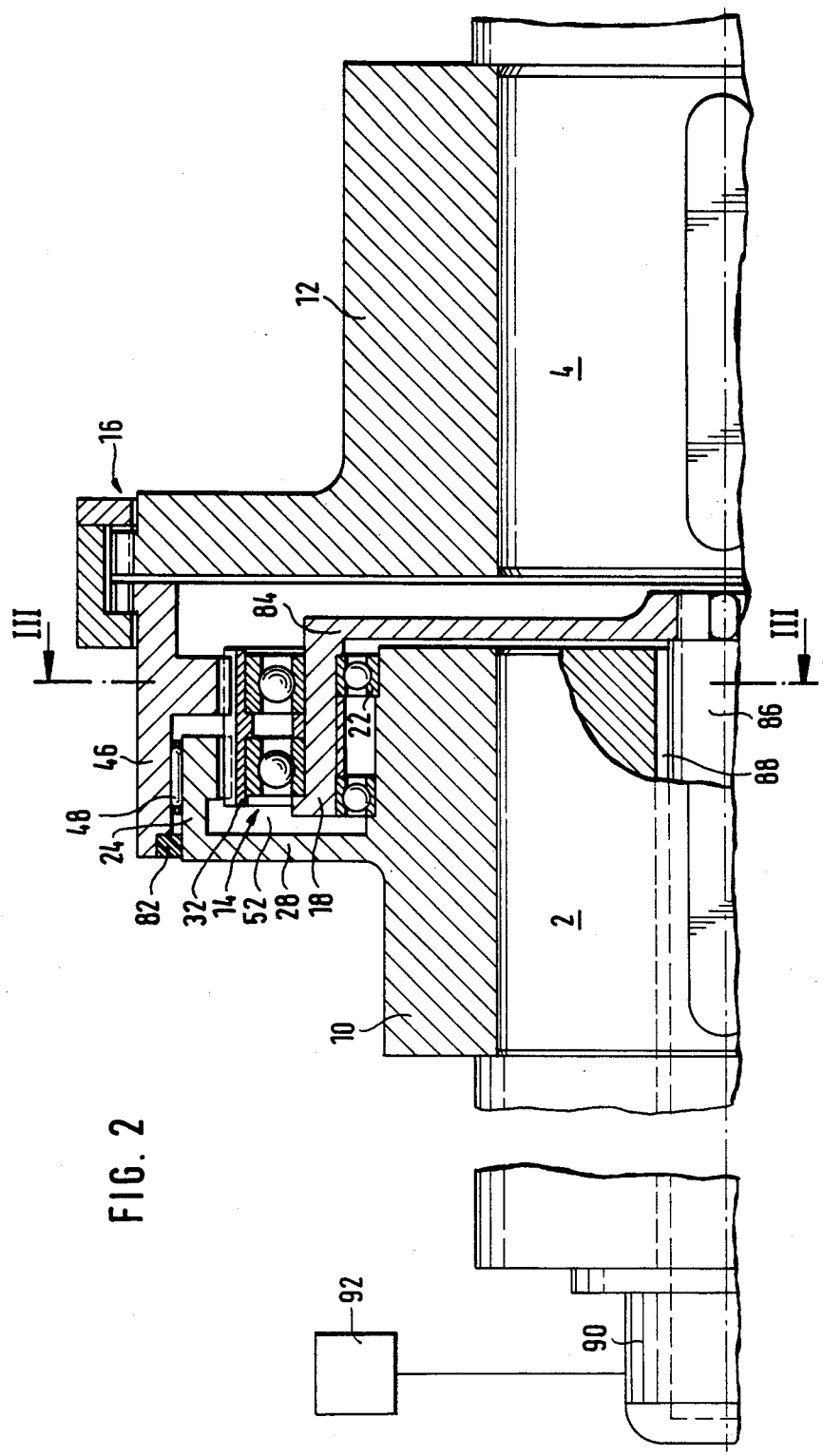
FIG. 2 is an axial longitudinal cross-section through an embodiment having only one transmission-step, the transmission or hollow shaft being adapted to be actuated by means of an adjusting shaft passing through the shaft of the machine.

The embodiment of FIG. 2 comprises a transmission 14 having a single step which again is in the form of a sliding-wedge transmission. Components in FIG. 2 which are of the same design, and/or perform the same functions, as components in FIG. 1, have the same reference numerals, and reference is made to the foregoing description for such components. Flange 28 is arranged, in this case, approximately in the middle of clutch-hub 10, a sealing ring 82 being provided between ring 24 and surrounding hollow wheel 46, thus reliably preventing the ingress of dirt. Hollow wheel 46 is mounted upon ring 24 by means of a bearing 48 in the form of a needle-bearing.

Transmission-shaft 18 is provided on a radial disc 84 secured to an adjusting shaft 86 located in a bore 88 in machine-shaft 2. Located at the free end of machine-shaft 2 is an electric motor 90 which is used to drive adjusting shaft 86. The adjusting device also contains an electronic control-unit 92 which predetermines the specific difference in rotational speed between adjusting shaft 86 and machine-shaft 2. Tachometers, not shown but connected to control-unit 92, are provided to determine the rotational speeds of machine shaft 2, adjusting shaft 86 and electric motor 90. The latter is preferably arranged stationarily but may also be connected to machine-shaft 2. Controlunit 92 permits a specific rotational-speed difference to be predetermined. Thus for a rotational-speed difference of zero, adjusting shaft 86 rotates in synchronism with machine-shaft 2, and machine-shaft 4 therefore rotates at the same speed. Other components connected to machine-shaft 2, and pertaining to the working machine or the driving machine, are not shown since they do not pertain to the invention. This design therefore constitutes an infinitely variable over-ride transmission.

Figure 3:
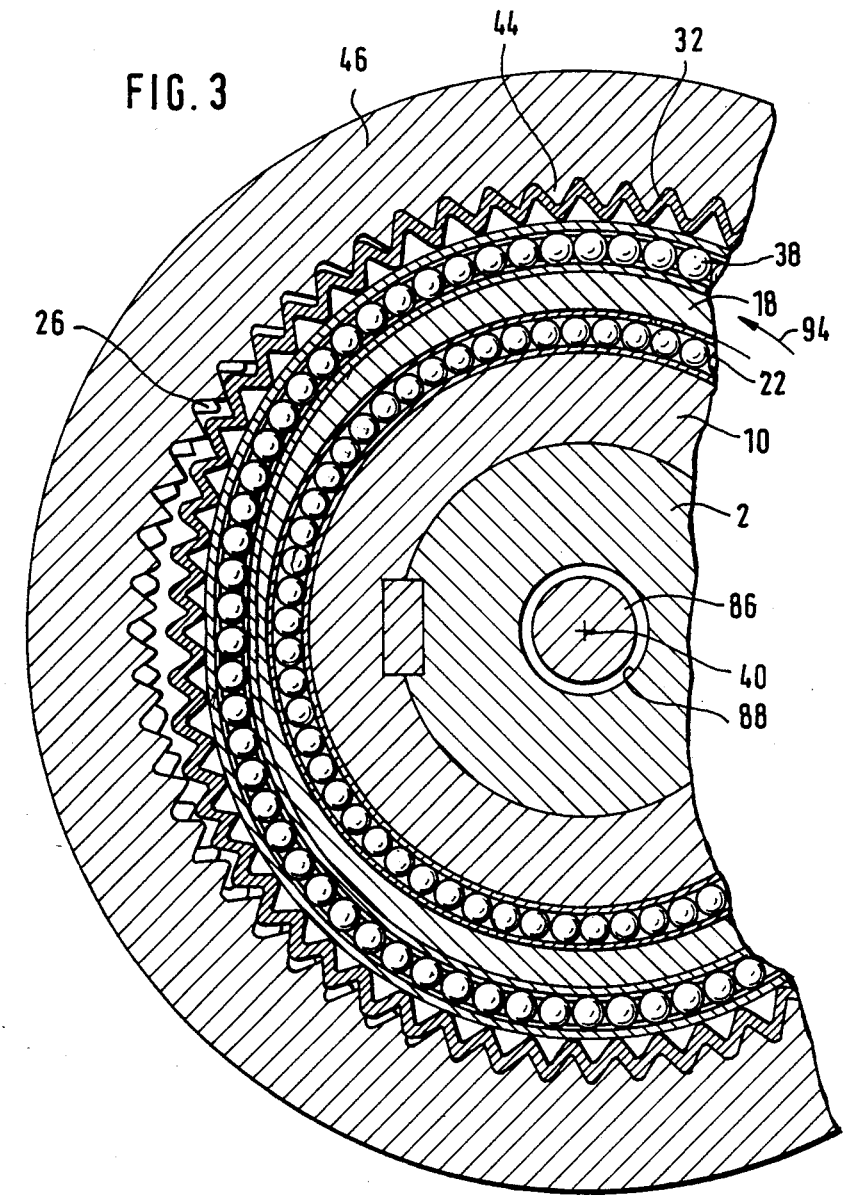
FIG. 3 is a transverse cross-section, to an enlarged scale, taken along line III in FIG. 2.

FIG. 3 is a diagrammatic cross-section along line III—III of FIG. 2. Adjusting shaft 86 may be seen in bore 88 in first clutch-hub 10. Transmission-shaft 18 is mounted upon the latter by ball-bearing 22, the oval shape of the outer surface of transmission-shaft 18 being clearly visible. As a result of this oval configuration of the outer surface of transmission-shaft 18, toothed band 32 is pressed into the gaps between teeth 44 of hollow wheel 46 in diametrically opposite areas, i.e. at the top and bottom of the drawing. In these areas, toothed band 32 also engages in the gaps between the teeth 26 of ring 24. Displaced at an angle of 90°, and shown here laterally, are teeth 26, and, at this location, toothed band 32 does not engage in the gaps between the teeth because of the above mentioned design of transmission-shaft 18. It should be emphasized that, in the case of the present sliding-wedge coupling, toothed band 32 engages in the virtual gaps which are common to teeth 26 and 44. Thus profiles of the teeth of band 32 are always parallel with longitudinal axis 40. If transmission-shaft 18 rotates in synchronism with first clutch-hub 10, hollow wheel 46 will be carried along in synchronism. If, on the other hand, transmission-shaft 18 rotates in the direction of arrow 94, for example, at a rotational speed different from that of first clutch-hub 10, then the diametrically opposed areas of engagement described hereinbefore shift accordingly. Because of the difference in the number of teeth 26, hollow wheel 46 will then have a rotational speed different from that of first clutch-hub 10.

Figure 4:
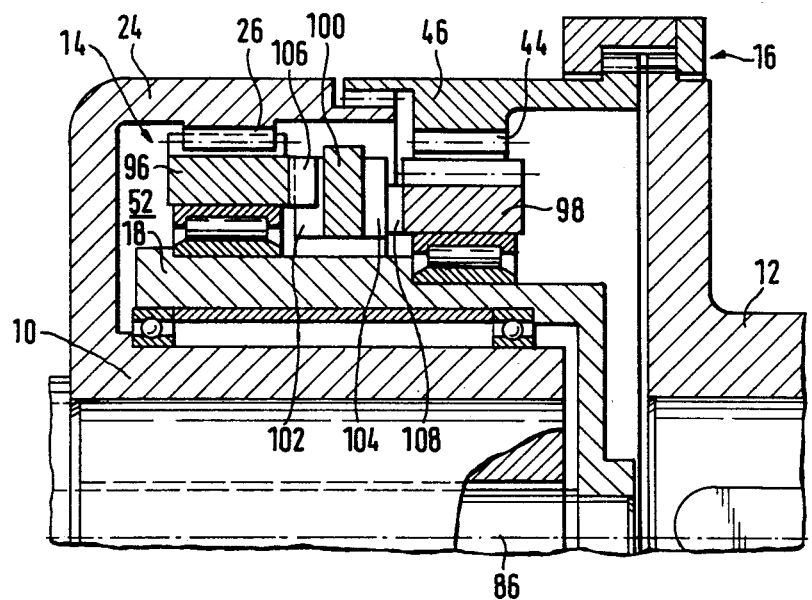
FIG. 4 is an axial longitudinal cross-section through an embodiment including an eccentric swashplate transmission.

Again, in the embodiment of FIG. 4, components which are of the same design and/or function as in previous embodiments bear the same reference numerals. In this case, transmission 14 is in the form of an eccentric swashplate transmission comprising two solid toothed-wheels 96, 98. Associated with the latter, are teeth 26 of ring 24 and teeth 44 of hollow wheel 46. The swashplate movement requires a special transfer-element 100 provided with opposing longitudinal slots 102, 104. Sliding in these slots are suitably designed cams 106, 108 of the gearwheels 96, 98. Transmission 14 is again driven by transmission-shaft 18 which is in the form of a hollow-shaft and is adapted to be actuated by adjusting shaft 86. The outer surface of transmission shaft 18 is eccentric, but in order to avoid internal stresses and imbalance, the eccentric locations are preferably displaced in relation to each other through an angle of 180°. In this embodiment, eccentric swashplate transmission 14 takes up somewhat more space than the sliding-wedge transmission described hereinbefore. Moreover, because of the larger reversal forces, larger braking torques are required to brake the transmission shaft. Although transmissions of the widest variety of designs may be used within the scope of this invention, the sliding-wedge transmission described hereinbefore has been found particularly satisfactory and considerably superior to other transmissions in many respects.

I claim:

1. A gearbox having a first clutch-hub formed with gear-teeth, a hollow wheel coaxial with said first clutch-hub and having gear-teeth, a second clutch-hub to which said hollow wheel is non-rotatably connected, a planetary gear at least partially meshing with the gear-teeth of said first clutch-hub and of said hollow wheel, a transmission shaft mounted on said first clutch-hub between said first clutch-hub and said hollow wheel, an adjusting device for adjusting said transmission shaft so that said first clutch-hub and said hollow wheel rotate selectively at different predetermined rotation speeds and in synchronism, wherein said first clutch-hub comprises a radially outward internal gear defining an annular space, said transmission shaft and planetary gear projecting at least partly into said annular space, and wherein said radially outward internal gear is non-rotatably connected to said first clutch-hub by a radial connecting flange, and said radial connecting flange closes one axial end of said annular space.

2. A gearbox according to claim 1, wherein said first clutch-hub forms a single part with said radially outward internal gear.

3. A gearbox according to claim 1, comprising at least two transmission-steps within said annular space, and an internally toothed sleeve joining said steps together.

4. A gearbox according to claim 3, wherein each transmission stage has a planetary gear bearingly mounted on said transmission shaft, and the sleeve which connects the two transmission stages extends in the axial direction between the gear-teeth on said hollow wheel and the gear-teeth of said radially outward internal gear on said first clutch-hub.

5. A gearbox according to claim 1, including a resilient element connecting said hollow-wheel and said second clutch-hub.

6. A gearbox according to claim 1, wherein said the gear-teeth of said first clutch-hub and of said hollow wheel form internal gears and the gear-teeth of said planetary gear are in the form of a toothed band.

7. A gearbox according to claim 6, wherein the gear-teeth of said internal gears are different in number and the teeth of said planetary gear are pressed partly into the virtual gaps betwen the gear-teeth of said internal gears; the profiles of the said teeth of said internal gears and of said planetary gear are substantially flat.

8. A gearbox according to claim 1, wherein said annular space is open at its axial end oppposite the axial end closed by said radial connecting flange, and a bearing for the transmission-shaft and a bearing for the planetary gear are provided in said annular space.

9. A gearbox according to claim 1, wherein the gear-teeth of said first clutch-hub and the gear-teeth of said hollow wheel which mesh with gear-teeth of said planetary gear lie axially adjacent each other on gear rings having substantially the same diameter.

10. A gearbox according to claim 1, wherein said transmission shaft is formed in the vicinity of said planetary gear as a closed ring.

11. A gearbox according to claim 1, wherein said planetary gear is substantially coaxial with the first and second clutch-hubs.

12. A gearbox having a first clutch-hub formed with gear-teeth, a hollow wheel coaxial with said first clutch-hub and having gear-teeth, a second clutch-hub to which said hollow wheel is non-rotatably connected, a planetary gear at least partially meshing with the gear-teeth of said first clutch-hub and of said hollow wheel, a transmission shaft mounted on said first clutch-hub between said first clutch-hub and said hollow wheel, an adjusting device for adjusting said transmission shaft so that said first clutch-hub and said hollow wheel rotate selectively at different predetermined rotation speeds and in synchronism, wherein said adjusting device comprises: a stationary component, a brake having a housing connected non-rotatably to said stationary component; said brake having a brake-shoe axially displaceable and non-rotatably connected to said transmission shaft; said brake-shoe having two conical surfaces adapted to be frictionally applied selectively to the first clutch-hub and to the brake-housing.

13. A gearbox having a first clutch-hub formed with gear-teeth, a hollow wheel coaxial with said first clutch-hub and having gear-teeth, a second clutch-hub to which said hollow wheel is non-rotatably connected, a planetary gear at least partially meshing with the gear-teeth of said first clutch-hub and of said hollow wheel a transmission shaft mounted on said first clutch-hub between said first clutch-hub and said hollow wheel, an adjusting device for adjusting said transmission shaft so that said first clutch-hub and said hollow wheel rotate selectively at different predetermined rotation speeds and in synchronism, wherein said adjusting device comprises a control-unit and an electric motor for the purpose of predetermining an adjustable rotation-speed difference between said transmission-shaft and said first clutch-hub in predetermined manner.

14. A gearbox having a first clutch-hub formed with gear-teeth, a hollow wheel coaxial with said first clutch-hub and having gear-teeth, a second clutch-hub to which said hollow wheel is non-rotatably connected, a planetary gear at least partially meshing with the gear-teeth of said first clutch-hub and of said hollow wheel, a transmission shaft mounted on said first clutch-hub between said first clutch-hub and said hollow wheel, an adjusting device for adjusting said transmission shaft so that said first clutch-hub and said hollow wheel rotate selectively at different predetermined rotation speeds and in synchronism, and a resilient element connecting said hollow wheel and said second clutch-hub, wherein said hollow wheel and said second clutch-hub each have an externally toothed ring with which said connecting element engages.

15. A gearbox according to claim 14, wherein said connecting element is a toothed band or planetary gear of a sliding-wedge clutch type; said toothed rings of said hollow wheel and said second clutch-hub being arranged side by side at a short distance from each other, and wherein the teeth of the connecting element and the toothed rings are substantially flat.

* * * * *